Jan. 27, 1925.
W. E. STANLEY
FERRULE FOR FISHING RODS
Filed July 14, 1921
1,524,590
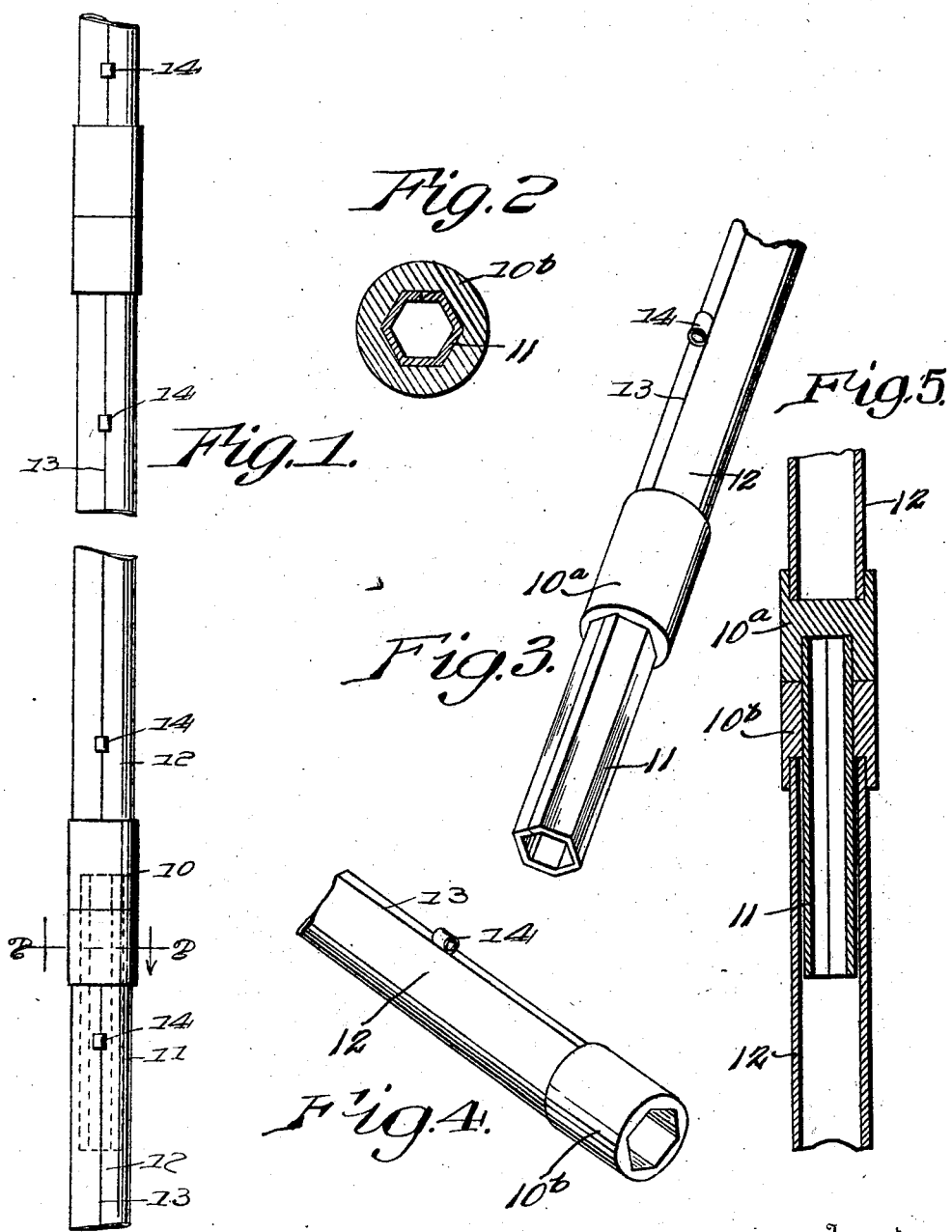
Inventor
W. E. Stanley,
By
Attorney Patented Jan. 27, 1925.

1,524,590

UNITED STATES PATENT OFFICE.

WILLIAM E. STANLEY, OF CAPE VINCENT, NEW YORK.

FERRULE FOR FISHING RODS.

Application filed July 14, 1921. Serial No. 484,714.

*To all whom it may concern:*

Be it known that WILLIAM E. STANLEY, a citizen of the United States of America, residing at Cape Vincent, in the county of Jefferson and State of New York, has invented new and useful Improvements in Ferrules for Fishing Rods, of which the following is a specification.

The object of the invention is to provide a simple and efficient ferrule for use in connection with fishing rods particularly of the metallic or steel type wherein the sections or members are of rolled steel plate or tubing, and more particularly the object in view is to provide means for preventing the turning of the sections or members relatively after being joined, to prevent the disalignment of the line leads carried by the several sections or members and hence interference with the run of the line, to avoid the necessity of twisting the joints in engaging or disengaging the same and hence the wearing of the members of the joints with the result of producing an ultimate looseness which detracts from the efficiency of the rod, to maintain the seams of the several sections or members of the rod in an aligned position so that buckling of one or more of the sections in use may be prevented; and with these objects in view the invention consists in a construction and combination of parts of which a preferred embodiment is shown in the accompanying drawings, wherein:—

Figure 1 is a view of a rod embodying the invention.

Figure 2 is a detail sectional view of one of the joints on the plane indicated by the line 2—2 of Figure 1.

Figures 3 and 4 are detail views respectively of the joint members between the two sections.

Figure 5 is a central longitudinal sectional view through the joint members and connected sections.

The male and female interlocking elements of each of the joints 10 between adjoining sections or members 12 of the rod are angular in cross section, preferably hexagonal form as indicated, to provide for a longitudinal engagement thereof and prevent relative turning or rotary movement either in fitting the members together or through strain in the use of the rod, or in detaching the sections or members of the rod when it is to be folded or packed for transportation. The surfaces of the joint members may be sufficiently lubricated to permit of bringing them into proper interlocking engagement by a direct longitudinal movement and of disengaging the same by a similar longitudinal movement to avoid straining the connections between the joint members and the rod sections or members, and yet owing to the angular form of the cross section of the joint members the accidental relative turning thereof when engaged is prevented.

The joints 10 by which the sections 12 are secured together consist of the thimbles $10^a$ and $10^b$ respectively secured to adjacent sections 12. The thimble $10^a$ carries the interlocking element 11 which, as above stated, is preferably hexagonal in cross section and this element 11 engages the thimble $10^b$, the eye of which is of the proper cross sectional contour to receive it, the protruding end of the interlocking element 11 entering the section 12 to which the thimble $10^b$ is connected, the sections 12 being circular in cross section but of a diameter sufficient to telescopically receive the elements 11.

This construction of the joints provides for definitely arranging the seams 13 of the members or sections of the rod in alignment and by placing the line leads 14 on the several sections or members in spanning relation with or adjacent relation to said seams, the proper engagement of the joint members will insure the arrangement of the seams of the several sections or members in the desired alignment and also the proper aligned arrangement of the line leads. Obviously the advantage in aligning the line leads is to avoid undue friction upon or interference in the run of the line, and the advantage in arranging the seams of the rods or sections which may be of rolled or tubular material as shown in aligned relation is that by having the line leads located in straddling or adjacent relation thereto the seams are held uppermost in the use of the rod and hence the lateral strains upon the rod in fishing do not tend to buckle the same as will frequently occur when the seams are disposed at the sides of the rod or in a position to have the bend of the rod occur transversely to the line of the seam.

Having described the invention, what is claimed as new and useful is:—

A fishing rod of sectional construction having members of the rolled tubular type with line leads disposed adjacent to the longitudinal seams thereof, and ferrules for connecting said members having male and female interlocking elements provided with engaging faces of angular cross section.

In testimony whereof he affixes his signature.

WILLIAM E. STANLEY.